United States Patent
Takatsuto et al.

(10) Patent No.: US 7,444,233 B2
(45) Date of Patent: Oct. 28, 2008

(54) DIAGNOSTIC APPARATUS AND DIAGNOSTIC METHOD FOR AN INTERNAL COMBUSTION ENGINE

(75) Inventors: Rie Takatsuto, Tokyo (JP); Hiroshi Katoh, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 52 days.

(21) Appl. No.: 11/644,035

(22) Filed: Dec. 22, 2006

(65) Prior Publication Data

US 2007/0144145 A1 Jun. 28, 2007

(30) Foreign Application Priority Data

Dec. 27, 2005 (JP) .............................. 2005-374037
Dec. 27, 2005 (JP) .............................. 2005-374038
Dec. 27, 2005 (JP) .............................. 2005-374039

(51) Int. Cl.
*F01N 3/10* (2006.01)
*G06F 19/00* (2006.01)

(52) U.S. Cl. ........................... 701/114; 60/277; 60/284; 60/285; 73/114.71

(58) Field of Classification Search ............ 123/406.55, 123/406.7; 73/114.69, 114.71; 60/277, 284, 60/285; 701/107, 108, 113, 114
See application file for complete search history.

(56) References Cited

U.S. PATENT DOCUMENTS 4,134,262 A * 1/1979 Sugihara et al. ................ 60/289
5,385,017 A * 1/1995 Harada ......................... 60/284
5,483,946 A * 1/1996 Hamburg et al. ............. 123/686
6,721,649 B2 * 4/2004 Knott et al. .................. 701/114
6,735,938 B2 * 5/2004 Surnilla ......................... 60/274
6,823,726 B1 * 11/2004 Nagy ....................... 73/114.75
6,955,155 B2 * 10/2005 Surnilla ................. 123/339.11
7,013,215 B2 * 3/2006 Armstrong et al. .......... 701/114
7,032,572 B2 * 4/2006 Bidner et al. ........... 123/406.47
7,228,223 B2 * 6/2007 Braun ........................ 701/114

FOREIGN PATENT DOCUMENTS

JP 2001-132526 5/2001

* cited by examiner

*Primary Examiner*—Willis R. Wolfe, Jr.
*Assistant Examiner*—Johnny H. Hoang
(74) *Attorney, Agent, or Firm*—Global IP Counselors, LLP

(57) ABSTRACT

A diagnostic apparatus for an internal combustion engine is disclosed herein. In one embodiment, the diagnostic apparatus comprises a catalytic converter and a controller. The catalytic converter is disposed in an exhaust passage of an engine and treats an exhaust gas component in the exhaust gas. The controller is adapted to perform a number of functions. More specifically, the controller is adapted to operate the engine with an engine control parameter to increase catalyst temperature of the catalytic converter during a cold engine condition. The controller is further adapted to calculate a temperature factor indicative to temperature increase of the catalyst based on the engine control parameter. The controller is further adapted to estimate the amount of the exhaust gas component flowing out of the catalytic converter based on the temperature factor. Finally, in one embodiment, the controller is adapted to determine malfunction of the engine operation to increase catalyst temperature of the catalytic converter based on the amount of exhaust gas component flowing out of the catalytic converter. A diagnostic method is also disclosed.

20 Claims, 10 Drawing Sheets

DIAGNOSTIC APPARATUS AND DIAGNOSTIC METHOD FOR AN INTERNAL COMBUSTION ENGINE

CROSS-REFERENCE TO RELATED APPLICATIONS

This application claims priority from Japanese Patent Application Ser. Nos. 2005-374039, 2005-374038, and 2005-374037 all of which were filed on Dec. 27, 2005, the disclosures of which, including its specifications, drawings and claims, are incorporated herein by reference in their entirety.

TECHNICAL FIELD

The present disclosure relates to a diagnostic apparatus and diagnostic method for an internal combustion engine employing a catalyst. The diagnostic apparatus and method are capable of treating an exhaust gas component contained in exhaust gas in the engine and suited to determine malfunction of engine operation to increase catalyst temperature under certain conditions.

BACKGROUND

In recent years in the field of automotive internal combustion engines, it has been desirable to improve exhaust purification. In particular, improvements for cold-start exhaust purification technologies suited to a time period from a cold engine start during which a catalyst is in an inactive state have been sought. Further, as stringent legal regulations regarding exhaust emissions have been implemented, the need for improved exhaust purification has become more pronounced. Therefore, when starting with a cold engine, to rapidly activate a catalyst, a catalyst temperature increase control, such as, for example, an idle speed increase control or an ignition timing retard control is performed. However, there is a need to perform a diagnosis operation to ensure that such control functions are performing normally.

An example of a diagnostic technology has been disclosed in Japanese Patent Provisional Publication No. 2001-132526. In this reference, during a cold engine start, engine speed and ignition timing are both monitored. A determination of a failure (a malfunction) is made when the monitored engine speed, after an elapse of a predetermined time period from the start of the operation of a catalyst temperature increase, is less than or equal to a predetermined value or when the monitored ignition timing (spark-advance value) is greater than or equal to a predetermined value.

However, in the system disclosed in the above-mentioned reference, the diagnostic operation cannot be initiated unless the predetermined delay time has expired under a specific engine operating condition, such as an idling operation, where engine speed feedback control and ignition timing feedback control are both executed. For example, when shifting to an acceleration-running mode for a comparatively short time period after the cold engine start, the diagnosis is not performed. Thus, there is a need for further improvement.

SUMMARY

A diagnostic apparatus for an internal combustion engine is disclosed herein. In one embodiment, the diagnostic apparatus comprises a catalytic converter and a controller. The catalytic converter is disposed in an exhaust passage of an engine and treats an exhaust gas component in the exhaust gas. The controller is adapted to perform a number of functions. More specifically, the controller is adapted to operate the engine with an engine control parameter to increase catalyst temperature of the catalytic converter during a cold engine condition. The controller is further adapted to calculate a temperature factor indicative to temperature increase of the catalyst based on the engine control parameter. The controller is further adapted to estimate the amount of the exhaust gas component flowing out of the catalytic converter based on the temperature factor. Finally, in one embodiment, the controller is adapted to determine malfunction of the engine operation to increase catalyst temperature of the catalytic converter based on the amount of exhaust gas component flowing out of the catalytic converter. A diagnostic method is also disclosed.

BRIEF DESCRIPTION OF DRAWINGS

Other features and advantages of the present system will be apparent from the ensuing description, taken in conjunction with the accompanying drawings, in which.

DETAILED DESCRIPTION

Figure 1:
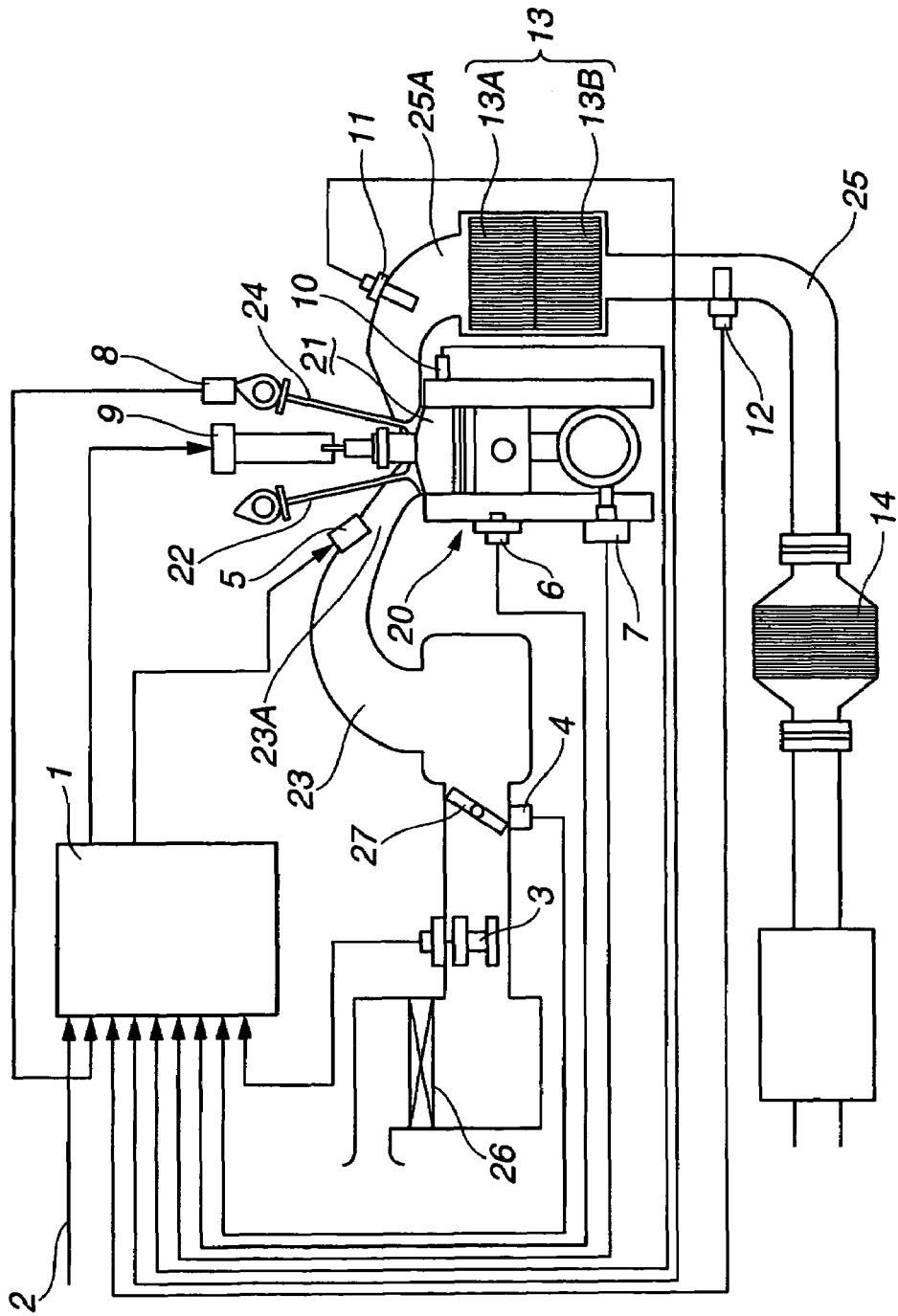
FIG. 1 is a system diagram showing an embodiment of an exhaust emission purification system for an internal combustion engine.

While the claims are not limited to the illustrated embodiments, an appreciation of various aspects of the system is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIRST EMBODIMENT

Hereinafter, a first embodiment of a diagnostic apparatus and method is explained with reference to the drawings. FIG. 1 illustrates an embodiment of an exhaust emission purification system employed in a gasoline internal combustion engine. A spark plug 9 is located at a substantially central upper portion of a combustion chamber 21 of an internal combustion engine 20. The combustion chamber 21 is connected to an intake air passage 23 through an intake valve 22 and connected to an exhaust passage 25 through an exhaust valve 24. An air cleaner 26, an airflow meter 3, an electronically-controlled throttle valve 27, a throttle opening sensor 4, and a fuel injection valve 5 are disposed in intake air passage 23, in that order, from the upstream side thereof. The airflow meter 3 is provided to measure an intake air flow rate. The throttle valve 27 is provided to open and close intake air passage 23 under appropriate conditions. The throttle opening sensor 4 is provided to detect a throttle opening. The fuel injection valve 22 is provided to inject fuel into an intake port 23A of intake air passage 23. It will be understood that the invention is not limited to such a port-injected internal combustion engine, but that the invention may be applied to an in-cylinder direct-injection internal combustion engine in which fuel is injected from a fuel injection valve directly into a combustion chamber.

To more effectively purify exhaust gas during engine operating conditions, including during a cold engine start, an exhaust emission purification system is constructed by a dual catalytic converter system whereby the catalytic converters are laid out in series to each other and located at respective installation positions. The catalytic converters are spaced apart from each other along exhaust passage 25 and have different ambient temperatures. More specifically, a front catalytic converter 13 is disposed in exhaust passage 25 and located at an exhaust manifold collective portion 25A, which is positioned close to combustion chamber 21 and has a comparatively high exhaust temperature. The front catalytic converter 13 may be located nearby exhaust manifold collective portion 25A upstream of the exhaust passage 25. A rear catalytic converter 14 is disposed downstream of front catalytic converter 13 and located under a vehicle floor panel, which has a comparatively low exhaust temperature.

In one embodiment, front catalytic converter 13 is an HC-adsorption three way catalytic converter that comprises a three way catalytic converter 13A combined with an HC-adsorption catalytic converter 13B. The three way catalytic converter 13A can reduce $NO_x$, HC, and CO emissions almost to zero close to a stoichiometric air/fuel (A/F) ratio. The HC-adsorption catalytic converter 13B is provided to temporarily adsorb hydrocarbons (HCs) exhausted before three way catalytic converter 13A is activated. For example, rear catalytic converter 14 may be constructed of the above-mentioned HC-adsorption catalytic converter. It is understood that the exhaust emission purification system is not limited to the described catalytic converter system, constructed by the three way catalytic converter 13A and the HC-adsorption catalytic converter 13B, as discussed above. As another type of catalytic converter, the catalytic converter system may include a $NO_x$ trap catalytic converter capable of trapping $NO_x$ at a lean A/F operating mode at which oxygen is excessive and of desorbing and reducing $NO_x$ at a stoichiometric or rich A/F operating mode. The three way catalytic converter 13A, the HC-adsorption catalytic converter 13B, and the $NO_x$ trap catalytic converter either alone or in any reasonable combination may be used.

An upstream oxygen sensor 11 and a downstream oxygen sensor 12 are both disposed in exhaust passage 25 and respectively located upstream of and downstream of front catalytic converter 13. Instead of using a simple oxygen sensor ($O_2$ sensor), a wide-area air fuel ratio sensor capable of detecting a wide range of air/fuel ratios may be used as sensors 11 and 12. Engine rotational speed (engine speed) can be calculated based on sensor signals detected by a position (POS) sensor 7 that detects an angular position of a crankshaft and a phase (PHASE) sensor 8 that detects a phase of a camshaft. A knock sensor 6 and a water temperature sensor 10 are installed on a cylinder block of engine 20. The knock sensor 6 is provided to detect a knocking condition (an engine knock). The water temperature sensor 10 is provided to detect an engine coolant temperature as an engine temperature.

An engine controller 1, serving as a an electronic control unit, is constructed by a generally-known digital computer system, which is comprised of a central processing unit (CPU), a read only memory (ROM), a random access memory (RAM), and an input-and-output interface. The controller 1 has a storing and executing function so as to permit the controller 1 to execute various control procedures. Various signals, for example a starter signal, an ignition signal and the like, are inputted via a signal line 2 into engine controller 1. Controller 1 outputs control signals that are determined based on the detected sensor signals from the sensors 3, 4, 6-8, and 10-12 to respective actuators so as to control their operations. For example, an injection quantity and injection timing of fuel sprayed by fuel injection valve 5 and ignition timing of spark plug 9 are controlled by the controller 1. The controller 1 executes air/fuel ratio feedback control based on the respective outputs from oxygen sensors 11 and 12.

When the engine is cold, such as during a cold engine start period that corresponds to several seconds after starting with a cold engine and during which time the catalyst temperature is still low and deactivated, there is a possibility that much HC emission remaining unpurified may be exhausted from the catalytic converter. As such, a cold-emission countermeasure, the above-mentioned HC-adsorption catalysts 13B and 14, are employed in the catalytic conversion system. Front catalytic converter 13 is located at or close to exhaust manifold collective portion 25A to increase the catalyst temperature of the catalytic converter. Also, in a predetermined idling range, the controller 1 performs catalyst temperature increase control in which (i) idle speed increase control is included in an idle speed control whereby the engine speed is controlled or adjusted to a predetermined idle speed (one of the control parameters) by way of feedback control, together with (ii) an ignition timing retard control whereby ignition timing (one of the control parameters) is retarded with respect to a minimum advance for best torque (MBT).

Figure 2:
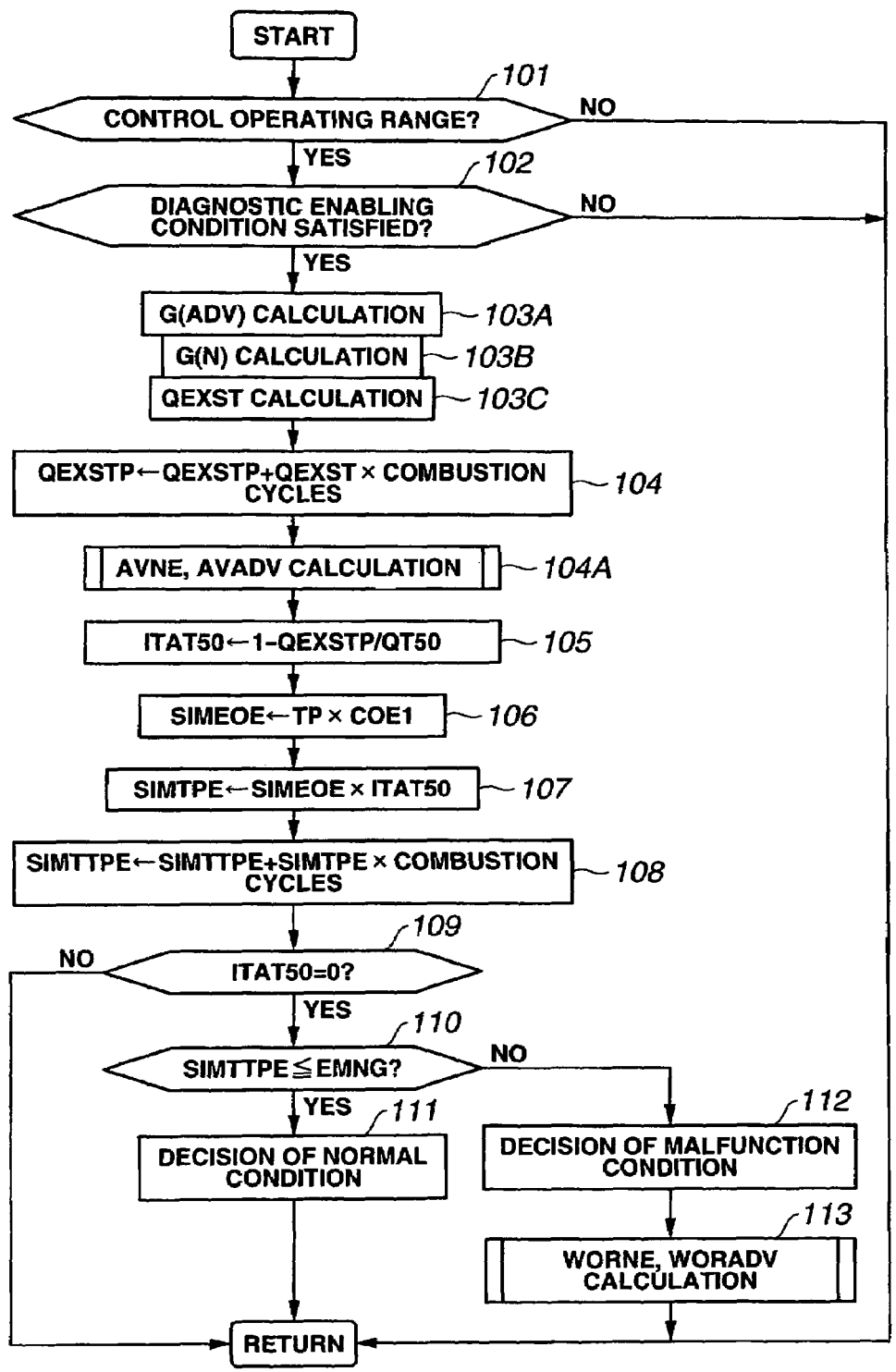
FIG. 2 is a flow chart illustrating diagnostic processing of a catalyst temperature increase control according to a first embodiment.

FIG. 2 is a flow chart illustrating diagnosis control processing used to diagnose whether catalyst temperature increase control is functioning normally during a cold engine operation. The routine is initiated by engine controller 1 immediately when the engine 20 is started, and repeatedly executed for a very short time period, specifically, every predetermined crank angle that a unit combustion (one or several times per combustion) is performed.

At step 101, a check is made to determine whether the operating condition of engine 20 is in a catalyst temperature increase control operating range, such as during a cold start, in which catalyst temperature increase control is executed. That is, a check is made to determine whether the engine is in a cold engine state wherein the catalyst is still deactivated. Specifically, a determination is made based on several conditions, for example, an engine temperature condition that the engine coolant temperature is less that or equal to a predetermined temperature value, ranging from approximately 20° C. to 30° C.

At step 102, a check is made to determine whether a predetermined diagnostic enabling condition is satisfied. Included as the diagnostic enabling condition is a condition on whether sensors related to exhaust temperature increase control (catalyst temperature increase control), for example, airflow meter 3, position sensor 7, phase sensor 8, and oxygen sensors 11-12, are operating normally. The diagnostic apparatus of the first embodiment is characterized in that it is possible to diagnose in a comparatively wide range of engine operating parameters of cold engine operations as well as an idling operation. Therefore, basically, individual operating conditions (idling operation and the like), engine load and engine speed are not included in the diagnostic enabling condition of step 102.

Figure 6:
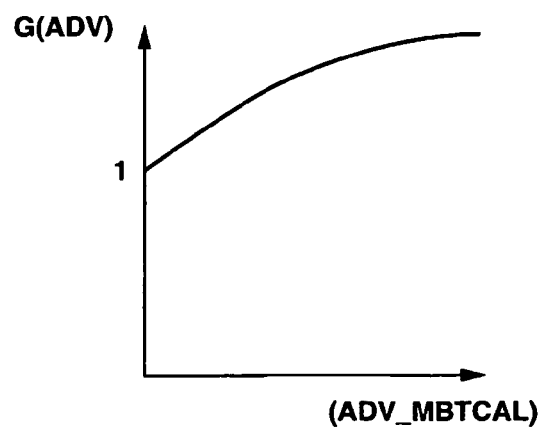
FIG. 6 is one example of a map table used to set an ignition timing correction factor G(ADV) that may be used at step 103A of FIG. 2.

At step 103A, an ignition timing correction factor G(ADV) is calculated based on the current ignition timing. Correction factor G(ADV) is calculated or retrieved based on a phase-retarded timing value ADV-MBTCAL retarded from minimum advance for best torque MBT from a control map-table shown in FIG. 6. As shown therein, the greater the phase-retarded timing value ADV-MBTCAL, the lower the combustion efficiency becomes, and therefore the higher the exhaust gas temperature can become. For this reason, correction factor G(ADV) is set, so that a unit exhaust supply quantity-of-heat QEXST increases. That is, correction factor G(ADV) corresponds to a temperature factor that is indicative of the temperature increase of the catalyst, occurring due to the phase-retarded ignition timing. Thus, the greater the phase-retarded timing value, the greater the correction factor G(ADV) is set.

Figure 7:
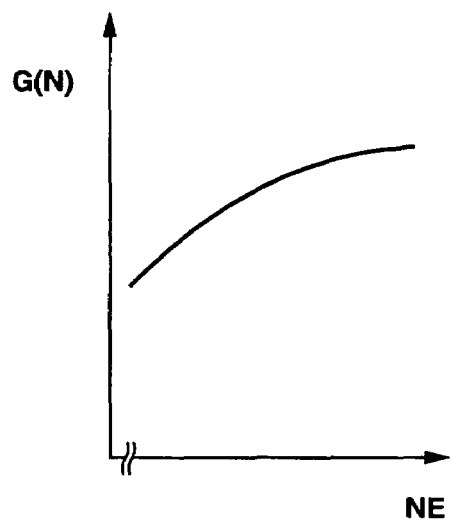
FIG. 7 is one example of a map table used to set a speed correction factor G(N) that may be used at step 103B of FIG. 2.

At step 103B, a speed correction factor G(N) is calculated based on the current engine speed NE. Correction factor G(N) is calculated or retrieved based on engine speed NE from a control map-table shown in FIG. 7. As shown therein, the higher the engine speed NE, the shorter the actual combustion time interval, and therefore the smaller the heat dissipation quantity. Thus, correction factor G(N) is set so that unit exhaust supply quantity-of-heat QEXST increases. That is, correction factor G(N) corresponds to a temperature factor indicative of temperature increase of the catalyst, occurring due to the increased engine speed. Thus, the higher the engine speed, the greater the correction factor G(N) is set.

At step 103C, unit exhaust supply quantity-of-heat QEXST, corresponding to a quantity of heat of exhaust gas, which can be supplied by one combustion (a unit combustion), is estimated or calculated. Specifically, the quantity-of-heat QEXST is calculated using the following equation (1):

$$QEXST = TP \times G(ADV) \times G(N) \quad (1)$$

where TP denotes a fuel injection quantity.

It is possible to effectively absorb and cancel fluctuations in unit exhaust supply quantity-of-heat QEXST that occur due to fluctuations in engine speed and/or fluctuations in ignition timing by using the above-mentioned correction factors G(ADV) and G(N).

At step 104, unit exhaust supply quantity-of-heat QEXST is integrated or totaled. A total exhaust supply quantity-of-heat QEXSTP is calculated. The total exhaust supply quantity-of-heat corresponds to a total quantity of heat of exhaust gas supplied to the catalyst 13 during the cold engine operation. Specifically, total exhaust supply quantity-of-heat QEXSTP is updated by adding a multiplied value of combustion cycles (i.e., combustion cycles with a unit combustion) counted for the previous arithmetic processing and unit exhaust supply quantity-of-heat QEXST to the previous total exhaust supply quantity-of-heat QEXSTP calculated one arithmetic-processing cycle before.

Figure 3:
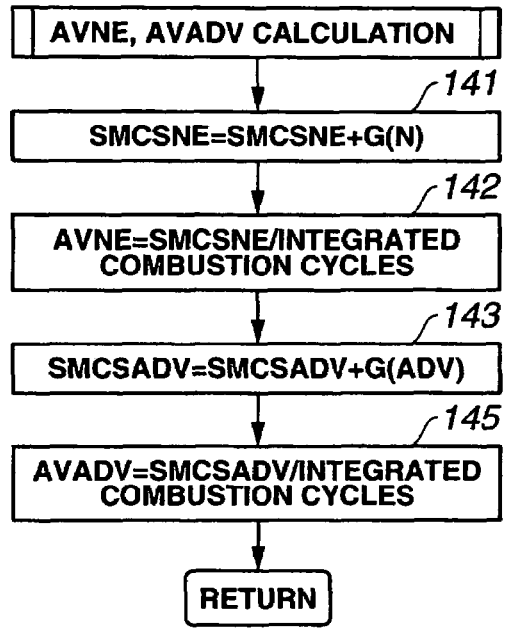
FIG. 3 is a flow chart illustrating a sub-routine for calculating a correction-factor average that is executed at step 104A of FIG. 2.

At the sub-routine of step 104A, an average value of the ignition timing correction factor G(ADV), simply, simply, an ignition timing correction factor average AVADV and an average value of the speed correction factor G(N), simply, a speed correction factor average AVNE are calculated. As seen in FIG. 3, at step 141, a speed correction factor integrated value SMCSNE is calculated based on speed correction factor G(N). Specifically, speed correction factor integrated value SMCSNE is updated by adding the speed correction factor G(N) calculated at the current arithmetic routine to the integrated value SMCSNE, which has been integrated until the previous routine. At step 142, speed correction factor average AVNE is calculated by dividing speed correction factor integrated value SMCSNE by the integrated combustion cycles.

At step 143, an ignition timing correction factor integrated value SMCSADV is calculated based on ignition timing correction factor G(ADV). Specifically, ignition timing correction factor integrated value SMCSADV is updated by adding the ignition timing correction factor G(ADV) calculated at the current arithmetic routine to the integrated value SMCSADV, which has been integrated until the previous routine.

At step 145, ignition timing correction factor average AVADV is calculated by dividing ignition timing correction factor integrated value SMCSADV by the integrated combustion cycles.

Returning again to FIG. 2, at step 105, a catalyst residual ratio ITAT50, corresponding to a ratio of hydrocarbons (HCs) remaining in the catalyst, is calculated. Catalyst residual ratio ITAT50 is greatly dependent on total exhaust supply quantity-of-heat (a total catalyst quantity-of-heat) QEXSTP, and therefore in the illustrative embodiment catalyst residual ratio ITAT50 is simply calculated only based on total exhaust supply quantity-of-heat (a total catalyst quantity-of-heat) QEXSTP, as shown in the following equation (2):

$$ITAT50 = 1 - QEXSTP/QT50 \quad (2)$$

where QT50 denotes a quantity of heat needed to activate the catalyst and is preset to a fixed value.

Figure 8:
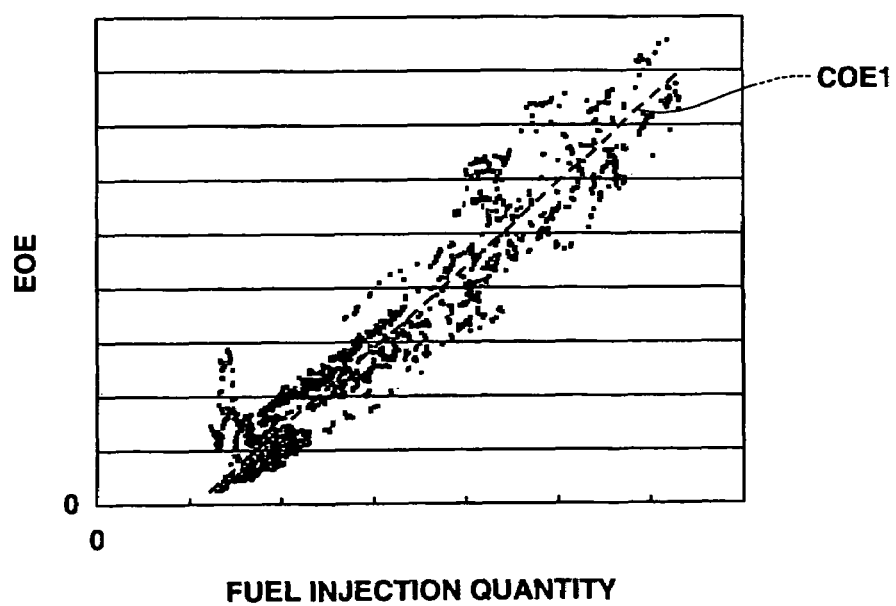
FIG. 8 is a graph illustrating the relationship between a fuel injection quantity and HC emission quantity exhausted from the engine.
Figure 9A:
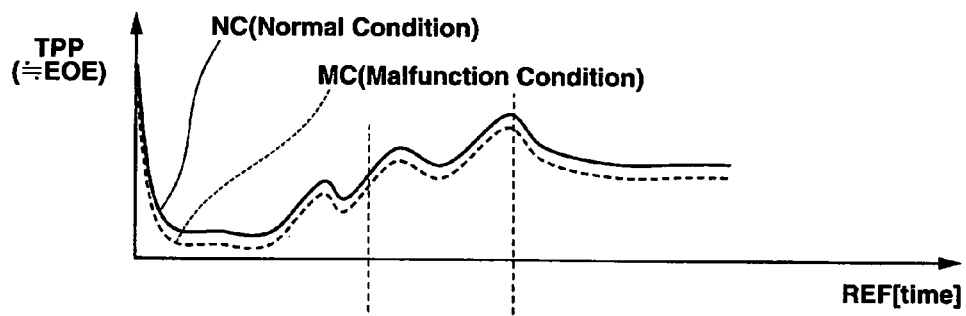
FIGS. 9A-9D are time charts illustrating variations in various parameters under a normal condition and under a malfunction condition during a cold engine start.
Figure 9B:
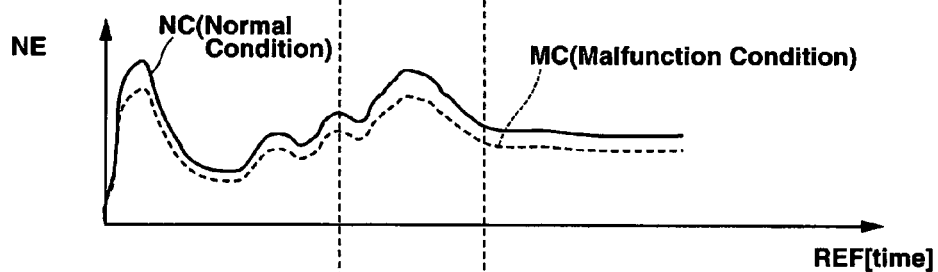
Figure 9C:
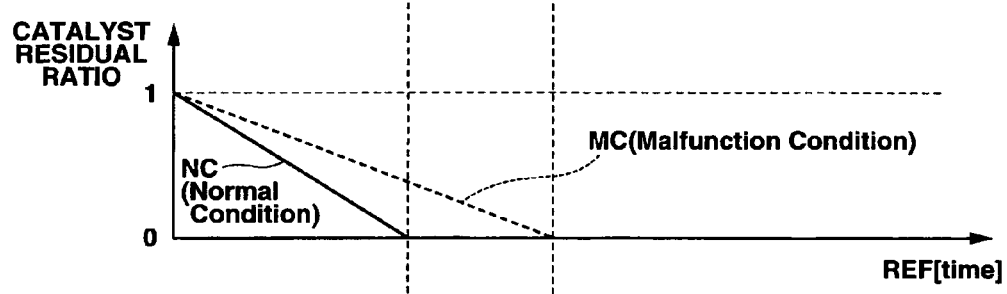
Figure 9D:
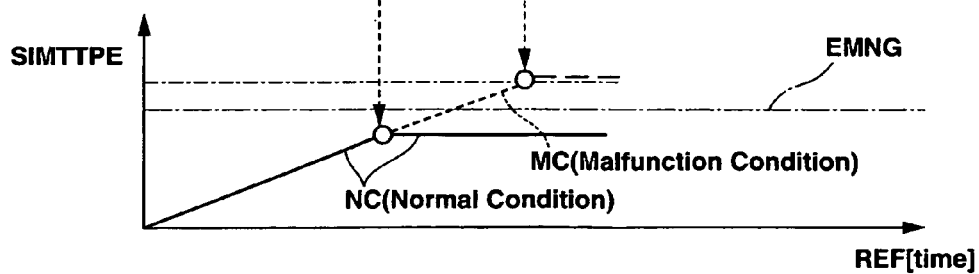

At step 106, an emission quantity EOE of HC emission exhausted from the combustion chamber of the internal combustion engine 20 during one combustion, that is, a unit engine emission quantity SIMEOE corresponding to the quantity of HC emission supplied to the catalyst, is estimated. As seen in FIG. 8, the emission quantity EOE is substantially proportional to fuel injection quantity TP. A ratio COEI (represented by the dotted line in FIG. 8) of emission quantity EOE to fuel injection quantity TP is almost constant. Therefore, at this step 106, the above-mentioned ratio COEI is simply set as a fixed coefficient, and thus unit engine emission quantity SIMEOE is calculated only based on fuel injection quantity TP.

At step 107 in FIG. 2, a unit catalyst emission quantity (a unit tailpipe HC emission) SIMTPE, corresponding to the quantity of HC emission exhausted into the downstream portion of the catalyst by a unit combustion, is calculated. At step 108, unit catalyst emission quantity SIMTPE is integrated, and then a catalyst emission quantity SIMTTPE, corresponding to the total emission quantity of tailpipe HC emission exhausted downstream of the catalyst, is calculated. Specifically, catalyst emission quantity SIMTTPE is cyclically updated by adding a multiplied value of combustion cycles with a unit combustion and unit catalyst emission quantity SIMTPE to the previous catalyst emission quantity SIMTTPE calculated one arithmetic-processing cycle before.

At step 109, a check is made to determine whether catalyst residual ratio ITAT50 reaches "0", which is a predetermined criterion value. In other words, a check is made to determine whether the catalyst has been activated. It will be appreciated that the criterion value is not limited to "0", but that the criterion value may be preset to a larger value for shortening the diagnosing time length. Alternatively, the criterion value may be preset to a smaller value for enhanced diagnostic accuracy.

When the decision result of step 109 is positive (YES), the routine proceeds to step 110. At step 110, a decision/diagnosis for the normal condition or malfunction condition of catalyst temperature increase control is made. Specifically, a check is made to determine whether catalyst emission quantity SIMTTPE is less than or equal to a predetermined criterion value EMNG. Criterion value EMNG is preset to a fixed value. For instance, criterion value EMNG is set to a value substantially corresponding to 1.5 times catalyst emission quantity SIMTTPE of the normal condition.

When the decision result of step 110 is positive (YES), the routine proceeds to step 111. At step 111, a determination that the catalyst temperature increase control is normal is made. Conversely, when the decision result of step 110 is negative (NO), the routine proceeds to step 112. At step 112, a determination that the catalyst temperature increase control is malfunctioning is made, and then the driver is informed of the malfunction by a warning indicator such as, for example, a warning lamp or an audible warning alarm.

Figure 4:
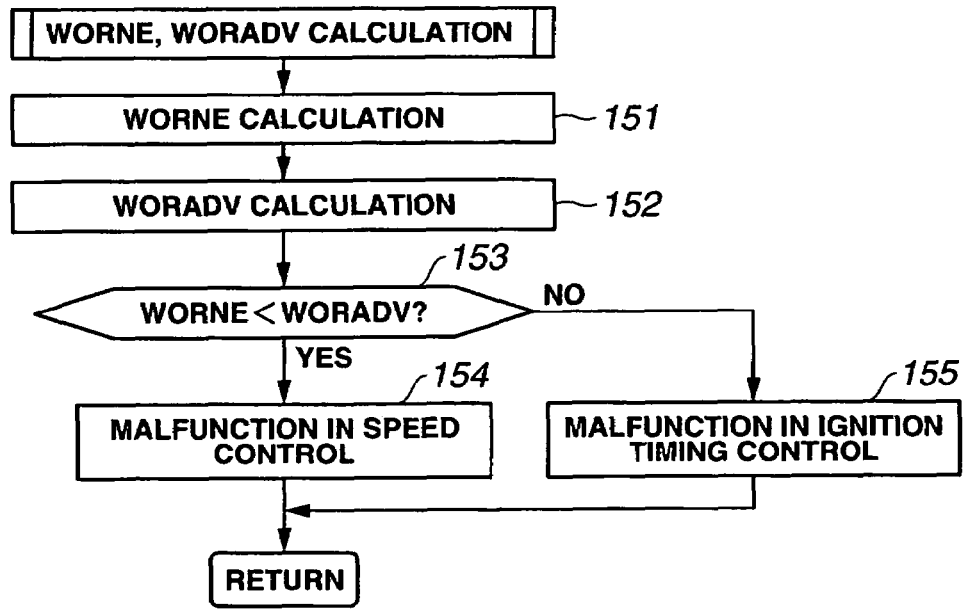
FIG. 4 is a flow chart illustrating one example of a sub-routine for performing a normal-level calculation that is executed at step 113 of FIG. 2.

Additionally, when a determination that the catalyst temperature increase control is malfunctioning is made, a normal level WORADV of ignition timing compensation and a normal level WORNE of speed increase control are calculated by the sub-routine of step 113. As seen in FIG. 4, at step 151, the normal level WORNE of speed increase control is calculated by the following equation (3):

$$WORNE=(AVNE-AVFNE)/(AVTNE-AVFNE) \quad (3)$$

where WORNE denotes an index indicating a normal level or a normal degree (or a normality) of speed increase control and becomes a value that is approximately "1" under the normal condition and becomes a value that is approximately "0" under the malfunction condition, and AVFNE denotes a value corresponding to a speed correction factor of the malfunction condition and preset to a fixed value, and AVTNE denotes a value corresponding to a speed correction factor of the normal condition and preset to a fixed value.

At step 152, a normal level WORADV of ignition timing compensation, that is, ignition timing retard control, is calculated using the following equation (4):

$$WORADV=(AVADV-AVFADV)/(AVTADV-AVFADV) \quad (4)$$

where WORADV denotes an index indicating a normal level or a normal degree (or a normality) of ignition timing retard control and becomes a value that is approximately "1" under the normal condition and becomes a value that is approximately "0" under the malfunction condition, and AVFADV denotes a value corresponding to an ignition timing correction factor of the malfunction condition and preset to a fixed value, and AVTADV denotes a value corresponding to an ignition timing correction factor of the normal condition and preset to a fixed value.

For example, when ignition timing correction factor G(ADV) of the minimum advance for best torque MBT is set to "1", the value AVFADV is set to "1" and the value AVTADV is set to a value ranging from approximately "1.2" to "1.3".

In the sub-routine FIG. 4, a check is made to determine which of speed increase control and ignition timing retard control is relatively normal or malfunctioning, so as to specify a cause of a malfunction in catalyst temperature increase control. Specifically, at step 153, normal level WORNE of speed increase control and normal level WORADV of ignition timing compensation are compared to each other. Then, it is determined that the control concerning a higher one of normal level WORNE and normal level WORADV is normal and a lower one of normal level WORNE and normal level WORADV is malfunctioning (see steps 154-155). The driver may be informed or warned of the result of decision. Alternatively, the result of decision may be merely stored as a reference for repairs.

Figure 5:
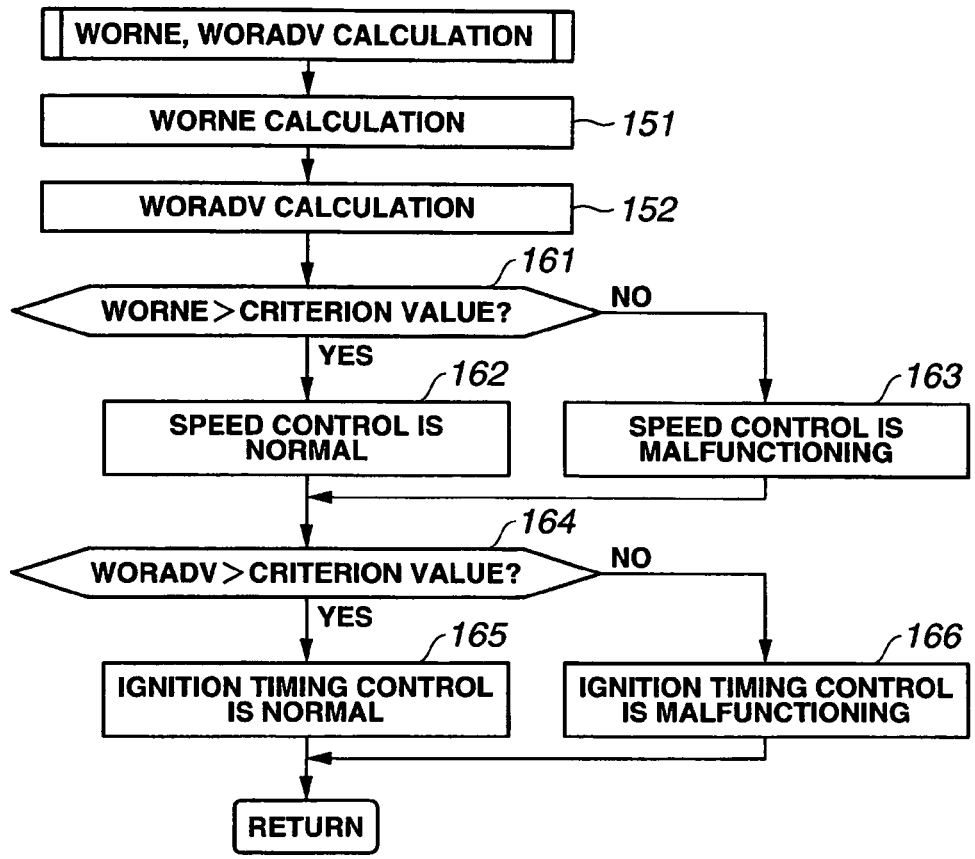
FIG. 5 is a flow chart illustrating another example of a sub-routine for performing a normal-level calculation that is executed at step 113 of FIG. 2.

FIG. 5 illustrates an alternative sub-routine that may be used instead of the sub-routine of FIG. 4. In the subroutine of FIG. 5, a determination is made concerning the normal condition or malfunction condition of each of speed increase control and ignition timing retard control. In the same manner as the sub-routine of FIG. 4, at steps 151 and 152, normal levels WORADV and WORNE are calculated. At the subsequent step 161, normal level WORNE is compared to a predetermined criterion value (a value less than "1"). When normal level WORNE is greater than the criterion value, a determination is made that speed increase control is normal (see step 162). Conversely, when normal level WORNE is less than or equal to the criterion value, a determination is made that speed increase control is malfunctioning (see step 163).

At step 164, normal level WORADV is compared to a predetermined criterion value (a value less than "1"). When normal level WORADV is greater than the criterion value, a determination is made that ignition timing retard control is normal (see step 165). Conversely, when normal level WORADV is less than or equal to the criterion value, a determination is made that ignition timing retard control is malfunctioning (see step 166).

FIGS. 9A-9D are time charts explaining the diagnostic operation performed by the apparatus of the first embodiment during a cold engine start. In the drawings, NC characteristics are indicated by the solid line correspond to a normal condition, whereas MC characteristics are indicated by the broken line correspond to a malfunction condition. The abscissa corresponds to a crank angle (a reference crank position REF). As shown in FIGS. 9A-9D, in the illustrative embodiment, catalyst emission quantity SIMTTPE is calculated, taking into account engine speed NE and ignition timing. Thus, catalyst emission quantity SIMTTPE tends to increase almost in proportion to the crank angle (combustion time interval) regardless of fluctuations in engine speed NE, and then reaches its upper limit nearby a point of time when catalyst residual ratio ITAT50 becomes "0". Therefore, it is possible to accurately diagnose for a short diagnosing time length by comparing the catalyst emission quantity SIMTTPE at this point of time with the criterion value EMNG.

Hereinafter listed are characteristics, operations and effects of the first embodiment. However, it will be understood that the characteristics of the diagnostic apparatus and method of the invention are not limited to the particular embodiments shown and described herein, but that various changes and modifications may be made without departing from the scope or sprit of this invention.

(1) The diagnostic apparatus of the first embodiment has at least one catalytic converter 13, 14, a catalyst temperature increase control, and a control unit. The catalytic converter 13, 14 is disposed in an exhaust system of internal combustion engine 20 to treat an exhaust gas component contained in exhaust gas. The catalyst temperature increase control utilizes engine speed increase control together with ignition timing retard control during a cold engine operation to accelerate a temperature increase of the catalyst. Controller 1 diagnoses the catalyst temperature increase control during the cold engine operation. The diagnostic apparatus is configured to calculate speed correction factor G(N) based on engine speed NE (see step 103A), and to calculate ignition timing correction factor G(ADV) based on ignition timing (see step 103B). The diagnostic apparatus is also configured to estimate, based on speed correction factor G(N) and ignition timing correction factor G(ADV), catalyst emission quantity SIMTTPE, corresponding to the emission quantity of the specific ingredient exhausted into the downstream side of the catalyst (see step 108). Based on this estimation, the diagnostic apparatus is configured to make a decision/diagnosis as to whether the condition of the catalyst temperature increase control is operating normally (is in the normal condition) or whether it has malfunctioned (is in the malfunction condition). The decision/diagnosis is based on catalyst emission quantity SIMTTPE (see steps 110-112). Additionally, the diagnostic apparatus is configured to calculate, based on speed correction factor G(N), normal level WORNE of speed increase control (see steps 141-142), and to calculate, based on ignition timing correction factor G(ADV), normal level WORADV of ignition timing retard control (see steps 143-145).

Suppose that catalyst temperature increase control malfunctions during a cold engine operation, and the catalyst temperature increase control is executed by use of speed increase control together with ignition timing retard control. Under this condition, catalyst emission quantity SIMTTPE, corresponding to the total emission quantity of tailpipe HC emission, which correlates to the specific ingredient finally exhausted into the downstream side of the catalyst, tends to increase. Therefore, it is possible to achieve a high-precision diagnosis by way of a simplified configuration that never requires a catalyst temperature sensor by estimating catalyst emission quantity SIMTTPE and by making the diagnosis based on the estimated catalyst emission quantity SIMTTPE.

In the above-described prior art whereby the diagnosis is merely made based on engine speed and ignition timing, the domain in which the diagnosis can be made is substantially limited to a specific operating range such as an idling range. In contrast, in the first embodiment described herein, speed correction factor G(NE) and ignition timing correction factor G(ADV) are calculated, fully taking into account the influence produced owing to engine speed NE and ignition timing, both serving as parameters for catalyst temperature increase control (catalyst warm-up control). Catalyst emission quantity SIMTTPE is set based on these correction factors. Accordingly, it is therefore possible to accurately calculate catalyst emission quantity SIMTTPE, while effectively reducing or eliminating a negative influence produced due to fluctuations in engine speed and/or ignition timing. Thus, it is possible to achieve a high-precision diagnosis regarding normality or abnormality (malfunction) of catalyst temperature increase control in a comparatively wide engine operating range.

As discussed above, it is possible to provide a high-precision system diagnosis. More specifically, it is possible to easily and accurately calculate normal level WORNE of speed increase control for a catalyst temperature increase and normal level WORADV of ignition timing retard control for a catalyst temperature increase, utilizing correction factors G(N) and G(ADV) in connection with arithmetic processing for catalyst emission quantity SIMTTPE calculation. That is, it is possible to compute or derive a normal degree and an abnormal degree of speed increase control and ignition timing retard control, respectively, without any adaptation and setting of new control parameters. As a result, it is possible to reduce the load on arithmetic operations and memory capacity.

(2) As discussed above, the above-mentioned normal levels WORNE and WORADV are calculated using the following equations:

$$WORNE=(AVNE-AVFNE)/(AVTNE-AVFNE)$$

$$WORADV=(AVADV-AVFADV)/(AVTADV-AVFADV)$$

In this manner, the individual indexes indicating the normal degree of speed increase control and the normal degree of ignition timing retard control, can be calculated, utilizing the fixed values (preset values), respectively, thereby indicating the malfunction condition and the normal condition. Therefore, it is possible to easily specify which of speed increase control and ignition timing retard control is malfunctioning by comparing one of the two levels WORNE and WORADV to the other (see step 153), when making a decision/diagnosis on the malfunction condition (normal condition) of catalyst temperature increase control.

(3) The diagnostic apparatus is configured to cyclically calculate, based on speed correction factor G(N) and ignition timing correction factor G(ADV), unit catalyst emission quantity SIMTPE, corresponding to the emission quantity of the specific ingredient exhausted into the downstream side of the catalyst for every unit combustion of the internal combustion engine (see step 103C), and to calculate catalyst emission quantity SIMTTPE by integrating unit catalyst emission quantity SIMTPE. Therefore, it is possible to accurately calculate the catalyst emission quantity, while absorbing fluctuations in engine speed and/or ignition timing for every unit combustion. It is preferable that the unit combustion is one combustion. Alternatively, the unit combustion may be several times combustion for a predetermined arithmetic time interval (crank angle) of the control routine.

(4) The diagnostic apparatus is configured to calculate speed correction factor average AVNE for every unit combustion of the engine (see step 142), and to calculate, based on the calculated speed correction factor average AVNE, normal level WORNE of speed increase control (see step 151). The diagnostic apparatus is configured to calculate ignition timing correction factor average AVADV for every unit combustion of the engine (see step 145), and to calculate, based on the calculated ignition timing correction factor average AVADV, normal level WORADV of ignition timing retard control (see step 152). Therefore, it is possible to accurately calculate the normal levels, while absorbing fluctuations in engine speed and/or ignition timing for every unit combustion.

(5) More specifically, the diagnostic apparatus is configured to calculate, based on speed correction factor G(N) and ignition timing correction factor G(ADV), catalyst residual ratio ITAT50, which corresponds to a ratio of the exhaust gas component remaining in the catalytic converter (see step 105), and to accurately calculate catalyst emission quantity SIMTTPE based on the calculated catalyst residual ratio ITAT50 (see step 108).

(6) The above-mentioned "catalyst residual ratio" relates to the catalyst active state and purification performance, and represents a state of the catalyst. Typically, the term "catalyst residual ratio" is defined as a catalyst residual ratio ITAT50, corresponding to a ratio of the exhaust gas component remaining in the catalyst. In lieu thereof, another parameter, such as a catalyst temperature detected or estimated by means of a catalyst temperature sensor and indicating an activated state of the catalyst, may be used.

(7) The diagnostic apparatus is configured to estimate, based on fuel injection quantity TP, unit exhaust supply quantity-of-heat QEXST, corresponding to a quantity of heat of exhaust gas, which can be supplied by a unit combustion of the engine (see step 103), and to calculate total exhaust supply quantity-of-heat QEXSTP by adding the integrated value of unit exhaust supply quantity-of-heat QEXST to a quantity-of-heat initial value TQEPINI (see step 104). As discussed above, it is possible to accurately calculate total exhaust supply quantity-of-heat QEXSTP in spite of a simplified configuration that never requires a catalyst temperature sensor for direct detection of a catalyst temperature. Additionally, total exhaust supply quantity-of-heat QEXSTP is calculated by integrating unit exhaust supply quantity-of-heat QEXST derived for every unit combustion. And thus, it is possible to accurately calculate total exhaust supply quantity-of-heat QEXSTP in a comparatively wide operating range containing a transient operating period during which the engine operating condition is varying.

(8) The diagnostic apparatus is configured to estimate, based on fuel injection quantity TP, unit engine emission quantity SIMEOE corresponding to the emission quantity of the specific ingredient exhausted from the engine by a unit combustion (see step 106), and to calculate, based on catalyst residual ratio ITAT50 and unit engine emission quantity SIMEOE, unit catalyst emission quantity SIMTPE (see step 107). In this manner, on the basis of unit engine emission quantity SIMEOE exhausted from the engine and simultaneously derived catalyst residual ratio ITAT50 indicating the state of the catalyst, unit catalyst emission quantity SIMTPE is calculated for every unit combustion. Thus, it is possible to accurately calculate unit catalyst emission quantity SIMTPE, while reflecting an active state of the catalyst in unit engine emission quantity SIMEOE.

(9) As discussed above, catalyst residual ratio ITAT50 is calculated using the following equation (see step 105):

$$ITAT50 = 1 - QEXSTP/QT50$$

ITAT50: Catalyst Residual Ratio
QEXSTP: Total Catalyst Quantity-of-heat
QT50: Quantity of heat needed for catalyst activation.
where the value QT50 is preset to a fixed value.

Therefore, it is possible to simply calculate catalyst residual ratio ITAT50 based only on total catalyst quantity-of-heat QEXSTP. As a result, it is possible to reduce the load on arithmetic operations and memory capacity.

(10) The diagnostic apparatus is configured to determine whether catalyst residual ratio ITAT50 is reduced below a predetermined value, e.g., "0" (see step 109), and to execute a diagnosis when it has been determined that catalyst residual ratio ITAT50 has been reduced below the predetermined value (ITAT50=0) (see steps 110-112). In this manner, it is possible to set a diagnosing time length by utilizing catalyst residual ratio ITAT50 used to calculate unit catalyst emission quantity SIMTPE. Thus, it is possible to effectively shorten the diagnosis time length without adding further parameters for decision/diagnosis.

(11) Typically, the previously-described exhaust gas component corresponds to hydrocarbons (HCs) in gasoline internal combustion engines. It will be appreciated that the invention may be applied to an exhaust emission purification system that the previously-described exhaust gas components are particulate matter (PM), nitrogen oxides ($NO_x$), and carbon monoxide (CO) emissions in Diesel engines.

SECOND EMBODIMENT

Figure 10:
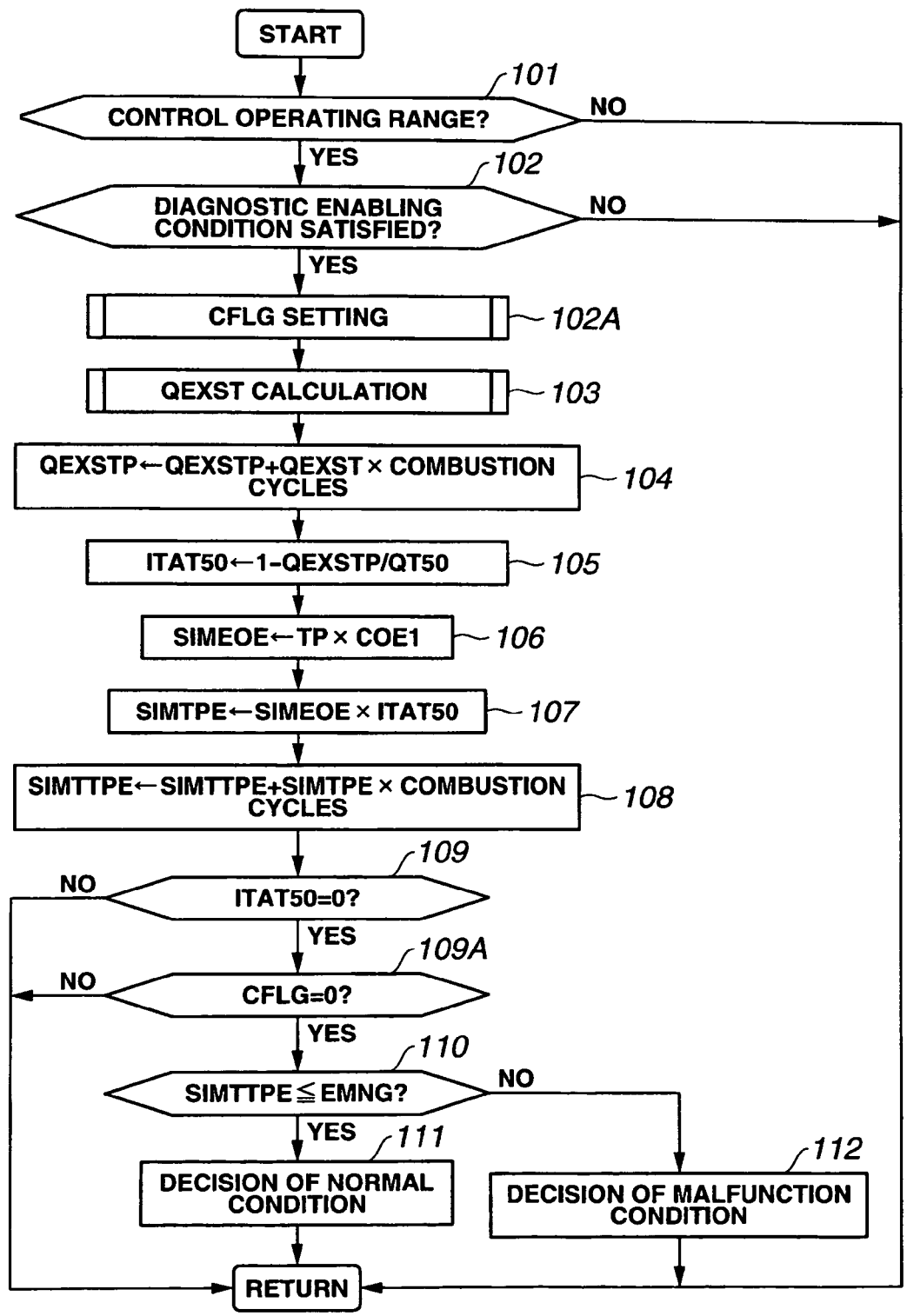
FIG. 10 is a flow chart illustrating diagnostic processing of catalyst temperature increase control according to a second embodiment of the invention.

Hereinafter explained is a second embodiment of diagnosis apparatus and method for an exhaust emission purification system. An exhaust emission purification system employed in a gasoline internal combustion engine of the second embodiment is identical to that of the first embodiment shown in FIG. 1. FIG. 10 is a flow chart illustrating diagnosis control processing used to diagnose whether the catalyst temperature increase control is functioning normally during a cold engine operation. Thus, the same step numbers used to designate steps in the flow chart of the first embodiment shown in FIG. 2 will be applied to the corresponding step numbers used in the modified flow chart shown in FIG. 10, for the purpose of comparing the two different flow charts. Only those steps that differ from the first embodiment will be hereinafter described in detail with reference to the accompanying drawings, while detailed description of the same steps will be omitted because the above description thereon seems to be self-explanatory.

Figure 11:
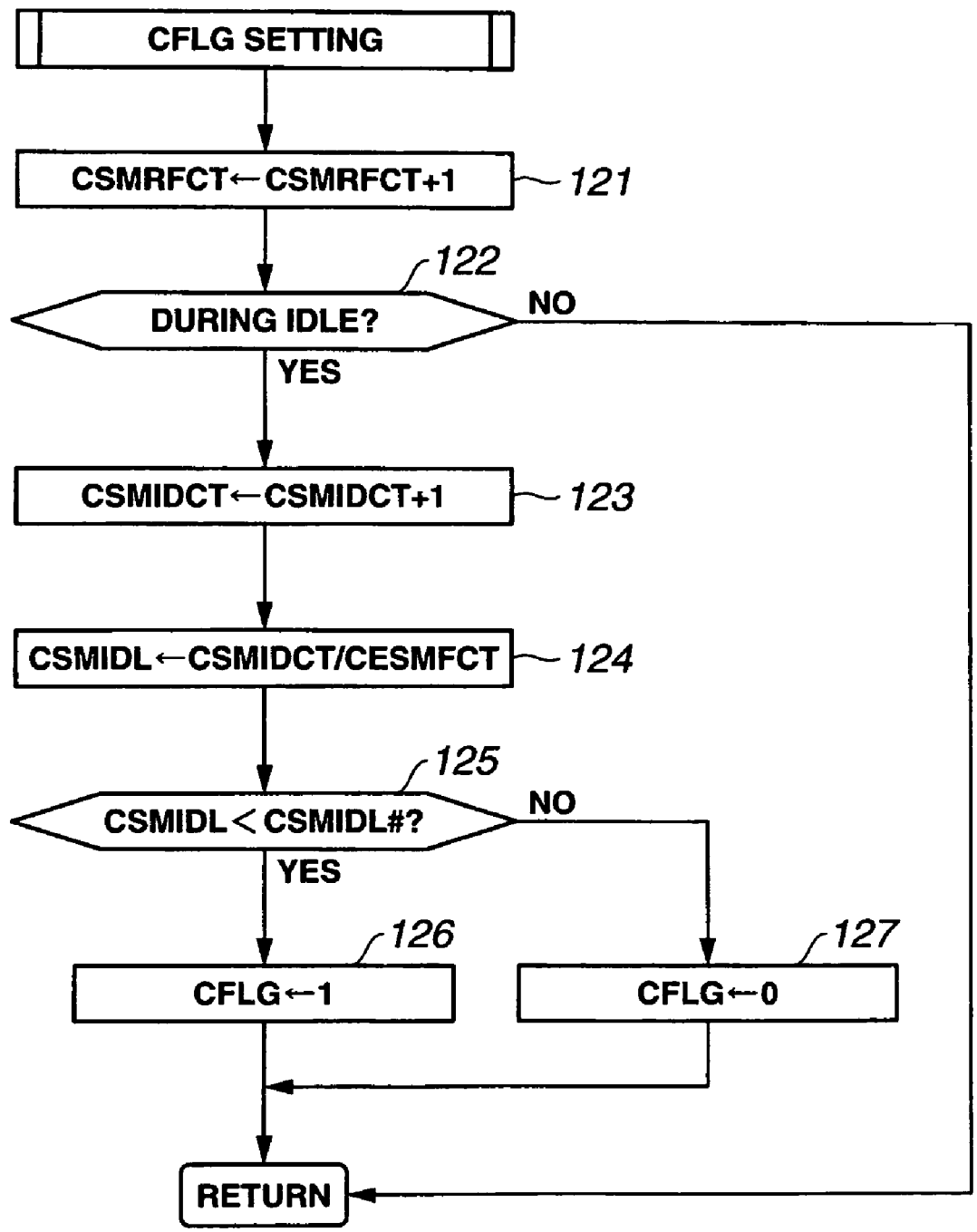
FIG. 11 is a flow chart illustrating a sub-routine for setting a diagnostic-determination cancel flag executed at step 102A of FIG. 10.

At the sub-routine of step 102A, a diagnostic-determination cancel flag CFLG is set. The sub-routine of step 1 02A is illustrated in FIG. 11. Specifically, as shown in FIG. 11, first, at step 121, a monitoring-period cumulative combustion count value CSMRFCT, corresponding to an integrated value of combustion cycles (with a unit combustion) during a cold engine operation at which catalyst temperature rise acceleration control is executed, is incremented by "1". At step 122, a check is made to determine whether the engine is idling, for example, whether an idle switch is turned ON. During an idle, the engine speed is controlled to a predetermined idle speed (a target idle speed) by way of feedback control. During idling in a cold engine state, for the purpose of catalyst temperature increase and warm-up acceleration, the target idle speed is set to a higher value than that of an engine warm-up state. That is, the speed increase control is executed as the above-mentioned catalyst temperature increase control. At step 123, an idling-period cumulative combustion count value CSMIDCT, corresponding to an integrated value of combustion cycles (with a unit combustion) produced when the idling operation is executed during cold engine operation, is incremented by "1". At step 124, an idle allotment ratio CSMIDL, corresponding to a ratio of execution of an idling operation during a cold engine operation, is calculated. Specifically, idle allotment ratio CSMIDL is calculated as a ratio (CSMIDCT/CSMRFCT) of idling-period cumulative combustion count value CSMIDCT to monitoring-period cumulative combustion count value CSMRFCT.

At step 125, idle allotment ratio CSMIDL is compared to a predetermined criterion value CSMIDL#. In one embodiment, the criterion value CSMIDL# is set to a value ranging from about "0.4" to about "0.6". In one specific embodiment, the criterion value CSMIDL# is set to a value substantially corresponding to "0.6". That is, when idling operation is executed at the ratio of approximately 50% during cold engine operation, the diagnostic operation is executed. When idle allotment ratio CSMIDL is less than its criterion value CSMIDL#, the sub-routine proceeds from step 125 to step 126. At step 126, diagnostic-determination cancel flag CFLG is set to "1". Conversely, when idle allotment ratio CSMIDL is greater than or equal to its criterion value CSMIDL#, the sub-routine proceeds from step 125 to step 127. At step 127, diagnostic-determination cancel flag CFLG is reset to "0".

Returning to FIG. 10, at step 103, unit exhaust supply quantity-of-heat QEXST, corresponding to a quantity of heat of exhaust gas, which can be supplied by a unit combustion of the engine, is estimated and calculated. Specifically, unit exhaust supply quantity-of-heat QEXST is calculated using the same equation (1) used at step 103C of the flow chart of the first embodiment shown in FIG. 2.

At step 109A, a check is made to determine whether diagnostic-determination cancel flag CFLG, which is set or reset through step 102A of FIG. 11, is reset to "0." In other words, a check is made to determine whether idle allotment ratio CSMIDL is greater than or equal to criterion value CSMIDL# and thus the diagnostic enabling condition is satisfied.

When the answers to steps 109 and 109A are both positive (YES), the routine proceeds to step 110. At step 110, a decision/diagnosis for the normal condition or the malfunction condition of catalyst temperature increase control is made. Specifically, a check is made to determine whether catalyst emission quantity SIMTTPE is less than or equal to predetermined criterion value EMNG. Criterion value EMNG is preset to a fixed value. For instance, criterion value EMNG is set to a value substantially corresponding to 1.5 times catalyst emission quantity SIMTTPE of the normal condition. When the decision result of step 110 is positive (YES), a determination that the catalyst temperature increase control is normal is made. Conversely, when the decision result of step 110 is negative (NO), a determination that the catalyst temperature increase control is malfunctioning is made, and then the driver is informed of the malfunction by, for example, a warning lamp or an audible warning alarm.

Hereinafter listed are characteristic configurations, operations and effects of the second embodiment. However, it will be understood that the configurations of the diagnostic apparatus and method of the invention are not limited to the particular embodiments shown and described herein, but that various changes and modifications may be made without departing from the scope or sprit of this invention.

(1) The diagnostic apparatus of the second embodiment has at least one catalytic converter 13, 14, a catalyst temperature increase control, a catalyst emission quantity control, and a decision control. The catalytic converter 13, 14 is disposed in an exhaust system (exhaust passage 25) of internal combustion engine 20 to purify a specific ingredient (HC) contained in exhaust gas. The catalyst temperature increase control (idle speed increase control, ignition timing retard control, and the like) is provided to accelerate a catalyst temperature increase during a cold engine operation. The catalyst emission quantity control (step 108) estimates catalyst emission quantity SIMTTPE, which corresponds to an emission quantity of the specific ingredient exhausted into the downstream side of the catalytic converter, based on a state of the catalytic converter during the cold engine operation. The decision control (steps 110-112) makes a decision/diagnosis as to whether the catalyst temperature increase control is operating normally or if it has malfunctioned, based on the estimated catalyst emission quantity SIMTTPE.

Basically, the previously-discussed diagnostic control is provided to diagnose whether cold-engine-operation catalyst temperature increase control (specifically, speed increase control included in idle speed control and ignition timing retard control) is executed normally. A speed increase greatly contributes to catalyst activation. Therefore, when shifting to an acceleration-running mode due to a driver's demand for torque increase just after a cold engine start, engine speed tends to greatly increase due to the torque increase, and thus the catalyst activation can be rapidly accelerated due to a factor different from catalyst temperature increase control. In such a case, it is impossible to make an accurate diagnosis on the catalyst temperature increase control. However, in the case where the diagnostic system is configured to execute a diagnosis only under a condition where the idling operation continues during the cold engine operation, there is a risk of a minor diagnostic frequency.

Therefore, in second embodiment of the invention, the diagnostic apparatus is configured to calculate a ratio CSMIDL of idling operation at which idle speed increase control, serving as one of catalyst temperature increase control, is executed during cold engine operation, and to inhibit execution of the above-mentioned decision control when the ratio CSMIDL is less than a predetermined criterion value CSMIDL# (see steps 125, 126), and to execute a decision/diagnosis only when the ratio CSMIDL of idling operation is greater than or equal to predetermined criterion value CSMIDL# (see steps 125, 127). Therefore, by properly setting the criterion value CSMIDL#, it is possible to effectively enhance the diagnostic accuracy, while preventing reduction of the diagnostic frequency. That is, it is possible to reconcile the enhanced diagnostic frequency and the enhanced diagnostic accuracy at a high level.

(2) As seen in FIG. 11, the diagnostic apparatus is configured to calculate an integrated value CSMRFCT of combustion cycles with a unit combustion during a cold engine operation, and to calculate an integrated value CSMIDCT of combustion cycles with a unit combustion produced when an idling operation is executed during cold engine operation. Thus, it is possible to easily and accurately calculate, based on both of the integrated values CSMRFCT and CSMIDCT, the ratio CSMIDL at which idling operation is executed during cold engine operation.

THIRD EMBODIMENT

Figure 12:
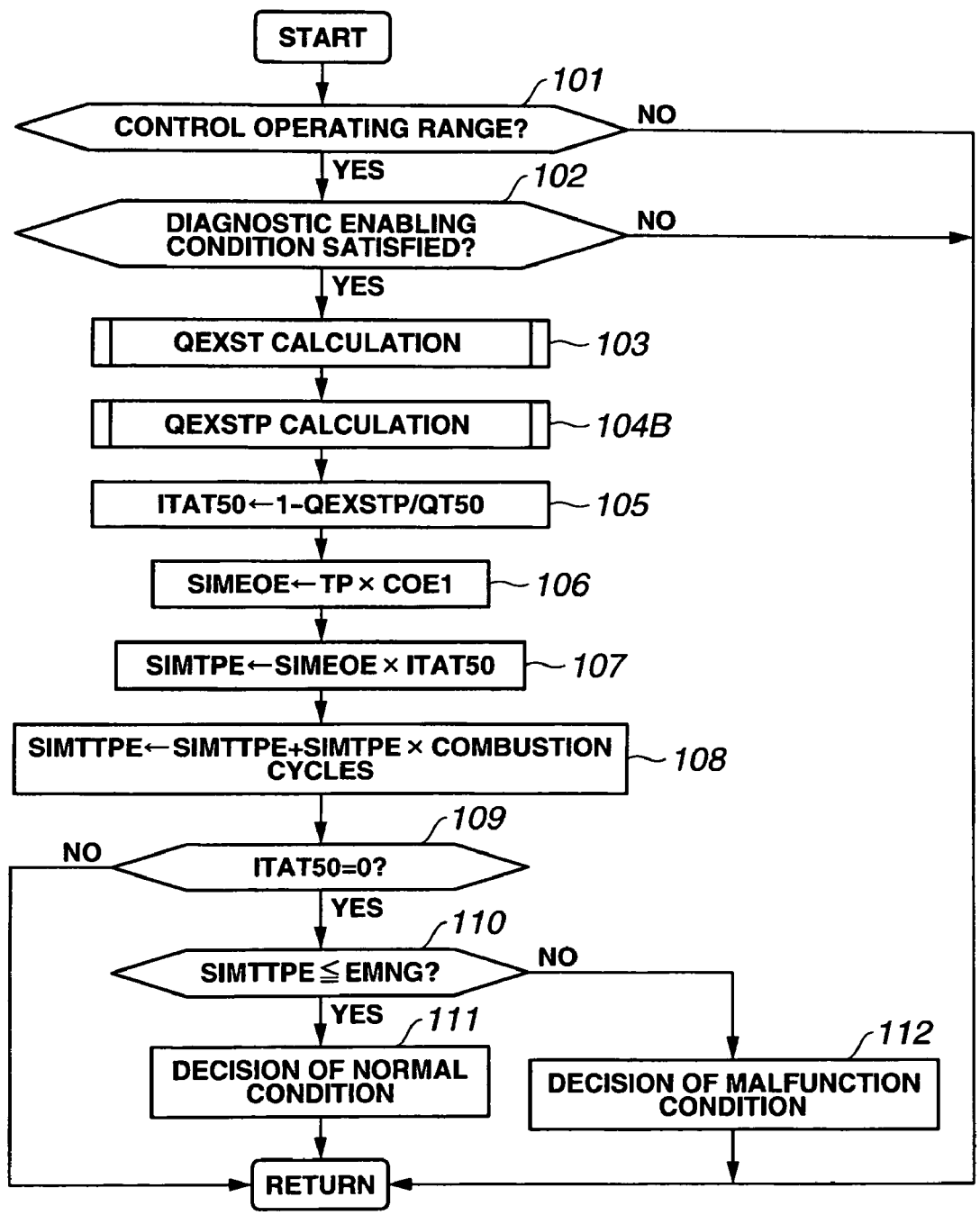
FIG. 12 is a flow chart illustrating diagnostic processing of catalyst temperature increase control according to a third embodiment of the invention.

Hereinafter explained is a third embodiment of a diagnostic apparatus and method for an exhaust emission purification system. An exhaust emission purification system employed in a gasoline internal combustion engine of the third embodiment is identical to that of the first embodiment shown in FIG. 1. FIG. 12 is a flow chart illustrating diagnosis control processing used to diagnose whether catalyst temperature increase control is functioning normally during a cold engine operation. Thus, the same step numbers used to designate steps in the flow chart of the first embodiment shown in FIG. 2 will be applied to the corresponding step numbers used in the modified flow chart shown in FIG. 12, for the purpose of comparing the two different flow charts. Only those steps that differ from one the first embodiment will be hereinafter described in detail with reference to the accompanying drawings, while detailed description of the same steps will be omitted because the above description thereon seems to be self-explanatory.

At step 103, unit exhaust supply quantity-of-heat QEXST, corresponding to a quantity of heat of exhaust gas supplied by a unit combustion of the engine, is estimated and calculated.

Specifically, unit exhaust supply quantity-of-heat QEXST is calculated by using the same equation as the equation (1) used at step 103C of the flow chart of the first embodiment shown in FIG. 2.

Figure 13:
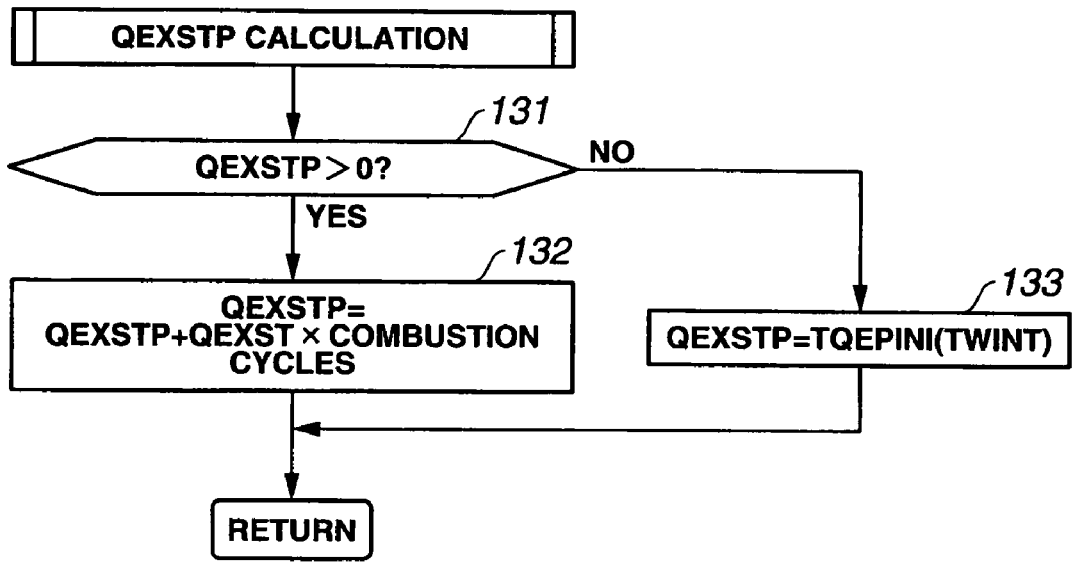
FIG. 13 is a flow chart illustrating a sub-routine for calculating total exhaust-heat quantity that is executed at step 104B of FIG. 2.

At the sub-routine of step 104B, total catalyst quantity-of-heat QEXSTP, corresponding to the quantity of heat that the catalytic converter holds, is calculated. Referring to FIG. 13, at step 131, a check is made to determine whether the engine is conditioned in an early stage of cold engine operation in which catalyst temperature increase control is executed, that is, whether the engine is in a starting state. Specifically, a check is made to determine whether total catalytic converter quantity-of-heat QEXSTP is an initial value "0" indicative of an initial state. In the illustrative embodiment, initial values of various control parameters including total catalyst quantity-of-heat QEXSTP are reset or initialized to "0" in an engine stopped state. Only at the first execution cycle of the sub-routine just after the engine has been started, does the flow from step 131 to step 133 take place. After the second execution cycle, the routine advances from step 131 to step 132.

Figure 14:
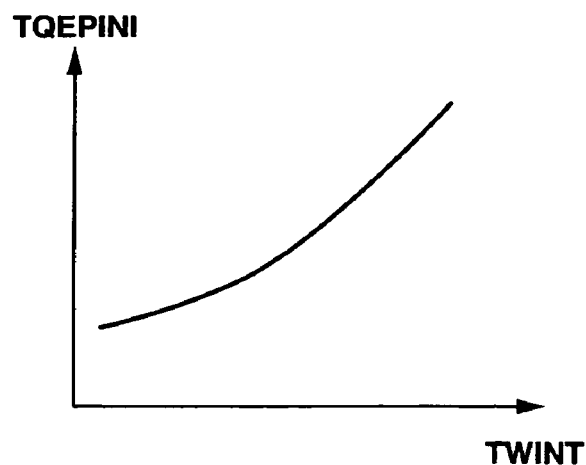
FIG. 14 is one example of a map table used to set a quantity-of-heat initial value TQEPINI that may be used at step 133 of FIG. 13.

Just after an engine start, at step 133, an initial value TQEPINI of a quantity of heat that the catalytic converter holds, is calculated based on engine coolant temperature TWINT, detected by water temperature sensor 10, from a preset control map-table shown in FIG. 14. As seen in FIG. 14, the higher engine coolant temperature TWINT, the higher the initial value TQEPINI is set. The quantity-of-heat initial value TQEPINI is set to total catalytic converter quantity-of-heat QEXSTP.

During the cold engine operation, at step 132, total catalytic converter quantity-of-heat QEXSTP is updated based on the previously-described unit exhaust supply quantity-of-heat QEXST. Specifically, total exhaust supply quantity-of-heat QEXSTP is updated by adding a multiplied value of combustion cycles (i.e., combustion cycles with a unit combustion) counted for the previous arithmetic processing and unit exhaust supply quantity-of-heat QEXST to the previous total exhaust supply quantity-of-heat QEXSTP calculated one arithmetic-processing cycle before. As set forth above, total exhaust supply quantity-of-heat QEXSTP corresponds to the integrated value of unit exhaust supply quantity-of-heat QEXST for combustion cycles, that is, a totaled value obtained by adding the quantity-of-heat initial value TQEPINI of the catalytic converter to the total exhaust supply quantity-of-heat supplied to the exhaust system.

Hereinafter listed are characteristic configurations, operations and effects of the third embodiment. However, it will be understood that the configurations of the diagnostic apparatus and method of the invention are not limited to the particular embodiments shown and described herein, but that various changes and modifications may be made without departing from the scope or sprit of this invention. For instance, in the illustrative embodiment, the water temperature, detected by water temperature sensor 10, is used as engine temperature. A simple technique utilizing water temperature sensor 10 for general engine control is used. In lieu thereof, engine oil temperature may be used as engine temperature. In order to more greatly enhance the accuracy, a catalyst temperature or a temperature of the environment of the catalytic converter may be detected directly.

The diagnostic apparatus of the third embodiment is configured to estimate, based on engine temperature TWINT detected by water temperature sensor 10, an initial value TQEPINI of a quantity of heat that a catalytic converter holds (see step 133), and to calculate unit exhaust supply quantity-of-heat QEXST that corresponds to a quantity of heat of exhaust gas supplied into an exhaust system of the engine (see step 103). The diagnostic apparatus of the third embodiment is also configured to estimate, based on the calculated unit exhaust supply quantity-of-heat QEXST and the estimated quantity-of-heat initial value TQEPINI, a state ITAT50 of the catalytic converter during cold engine operation (see steps 132, 105), and to estimate, based on the estimated state ITAT50 of the catalytic converter, catalyst emission quantity SIMTTPE, corresponding to an emission quantity of a specific ingredient exhausted into the downstream side of the catalytic converter during the cold engine operation (see step 108), and to make a decision/diagnosis for the normal condition or malfunction condition of catalyst temperature increase control, based on the estimated catalytic converter emission quantity SIMTTPE (see steps 110-112).

Suppose that catalyst temperature increase control malfunctions during a cold engine operation, at which the catalyst temperature increase control is executed by, idle speed increase control, ignition timing retard control, and the like. Under this condition, catalyst emission quantity SIMTTPE, which corresponds to the total emission quantity of tailpipe HC emission and correlates to the specific ingredient finally exhausted into the downstream side of the catalytic converter, tends to increase. Catalytic converter emission quantity SIMTTPE fluctuates due to a catalytic converter active state and purification performance, for example, catalytic converter residual ratio ITAT50 corresponding to a ratio of hydrocarbons (HCs) remaining in the catalytic converter, in addition to the quantity of HC emission exhausted from the engine. Therefore, it is possible to achieve a high-precision diagnosis by way of a simplified configuration that never requires a catalyst temperature sensor by estimating catalytic converter emission quantity SIMTTPE based on the state ITAT50 of the catalytic converter and by making the diagnosis based on the estimated catalytic converter emission quantity SIMTTPE.

In the above-described prior art in which the diagnosis is made mainly based on engine speed and ignition timing, the domain in which the diagnosis may be made is substantially limited to a specific operating range such as an idling range. In contrast, in the third embodiment, catalytic converter residual ratio ITAT50 corresponding to the state of the catalytic converter and catalytic converter emission quantity SIMTTPE are set, fully taking into account the influence produced due to ignition timing and engine speed (combustion time length) both serving as parameters for catalyst temperature increase control (catalyst warm-up control). That is, it is possible to calculate or derive catalytic converter emission quantity SIMTTPE, while effectively reducing or eliminating a negative influence produced due to fluctuations in engine speed and/or ignition timing. Thus, it is possible to achieve a high-precision diagnosis of the normality or abnormality (malfunction) of catalyst temperature increase control in a comparatively wide engine operating range, by making the diagnosis based on catalytic converter emission quantity SIMTTPE.

Catalytic converter residual ratio ITAT50 corresponding to the state of the catalytic converter is greatly dependent on the quantity of heat that the catalytic converter holds. The quantity of heat of the catalytic converter tends to increase due to the quantity of heat of exhaust gas supplied into the exhaust system. The catalytic converter residual ratio is greatly dependent on a catalytic converter temperature before a catalyst temperature rise occurs by the catalyst temperature increase control, for example, during a cold engine start. Suppose that the state of the catalytic converter is merely estimated based on a quantity of heat of exhaust gas supplied into the exhaust system. For example, when the engine is restarted under a state where the quantity of heat that the catalytic converter holds has already been high to some extent, such as during a hot restart in which the engine temperature is comparatively high, there is a possibility that the catalytic converter quantity-of-heat is estimated as an undesirably small value. In such a case, it is impossible to accurately diagnose.

Therefore, the diagnostic apparatus of the third embodiment is configured to estimate, based on an engine temperature, the initial value TQEPINI of the quantity of heat that the catalytic converter holds, and to estimate the state ITAT50 of the catalytic converter based on both of the quantity-of-heat initial value TQEPINI and the quantity of heat of exhaust gas supplied into the exhaust system. Thus, it is possible to realize a high-precision diagnosis, regardless of variations in engine temperature during an engine starting period, thereby realizing a high-precision diagnosis in a wide engine operating range.

The preceding description has been presented only to illustrate and describe exemplary embodiments of the exhaust system according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A diagnostic apparatus for an engine comprising:
   a catalytic converter disposed in an exhaust passage of an engine to treat an exhaust gas component in exhaust gas; and
   a controller adapted to:
      operate the engine with an engine control parameter to increase catalyst temperature of the catalytic converter during a cold engine condition;
      calculate a temperature factor indicative of temperature increase of the catalyst based on the engine control parameter;
      estimate an amount of the exhaust gas component flowing out the catalytic converter based on the temperature factor; and
      determine malfunction of the engine operation to increase catalyst temperature of the catalytic converter based on the amount of the exhaust gas component flowing out the catalytic converter.

2. A diagnostic apparatus as claimed in claim 1, wherein a heat amount supplied to the catalytic converter is derived based on the temperature factor, an activation state of the catalytic converter is determined based on the heat amount, and the amount of the exhaust gas component flowing out the catalytic converter is estimated based on the activation state of the catalytic converter and an amount of the exhaust gas component discharged from the engine.

3. A diagnostic apparatus as claimed in claim 1, wherein the amount of the exhaust gas component is a cumulative amount of the exhaust gas component flowing out the catalytic converter until the catalytic converter is activated, and the malfunction of the engine operation to increase catalyst temperature of the catalytic converter is determined based on whether the cumulative amount of the exhaust gas component flowing out the catalytic converter is less than or equal to a predetermined value.

4. A diagnostic apparatus as claimed in claim 1, wherein the engine control parameter is engine speed, and the engine speed is increased when temperature increase of the catalytic converter is desired.

5. A diagnostic apparatus as claimed in claim 1, wherein the engine control parameter is ignition timing of the engine, and the ignition timing is retarded when temperature increase of the catalytic converter is desired.

6. A diagnostic apparatus as claimed in claim 1, wherein the engine control parameter includes engine speed for an engine speed control and ignition timing for an ignition timing control of the engine, and wherein the engine speed is increased and the ignition timing is retarded when temperature increase of the catalytic converter is desired, and the temperature factor includes an engine speed factor calculated based on the engine speed and an ignition timing factor calculated based on the ignition timing.

7. A diagnostic apparatus as claimed in claim 6, wherein the controller is further adapted to calculate a normal level that indicates a normal engine speed control based on the engine speed factor and calculate a normal level that indicates a normal ignition timing control based on the ignition timing factor.

8. A diagnostic apparatus as claimed in claim 7, wherein the controller is further adapted to determine whether either one of the engine speed control and the ignition timing control is relatively malfunctioning by comparing the normal level of the engine speed control to the normal level of the ignition timing control.

9. A diagnostic apparatus as claimed in claim 1, wherein the controller is further adapted to calculate a unit exhaust gas component amount flowing out the catalytic converter for every combustion of the engine based on the temperature factor, and the amount of the exhaust gas component is a cumulative amount of the unit exhaust gas component amount flowing out the catalytic converter.

10. A diagnostic apparatus as claimed in claim 9, wherein the engine control parameter is engine speed, and the engine speed is increased when temperature increase of the catalytic converter is desired, and the temperature factor is calculated based on the engine speed.

11. A diagnostic apparatus as claimed in claim 9, wherein the control parameter is ignition timing of the engine, and the ignition timing is retarded when temperature increase of the catalytic converter is desired, and the temperature factor is calculated based on the ignition timing.

12. A diagnostic apparatus as claimed in claim 7, wherein the controller is further adapted to calculate an average value of the engine speed factor for every combustion of the engine, wherein the normal level of the engine speed indicates normal engine speed control that is calculated based on the average value of the engine speed factor, and wherein the controller is further adapted to calculate an average value of the ignition timing factor for every combustion of the engine, and the normal level of the ignition indicates normal ignition timing control that is calculated based on the average value of the ignition timing factor.

13. A diagnostic apparatus as claimed in claim 12, wherein the normal level of the engine speed control and the normal level of the ignition timing control is calculated by using the following equation:

$$WORNE=(AVNE-AVFNE)/(AVTNE-AVFNE)$$

$$WORADV=(AVADV-AVFADV)/(AVTADV-AV\text{-}FADV)$$

where WORNE denotes the normal level of the engine speed control,
AVNE denotes the average value of the engine speed factor,
AVFNE denotes a value corresponding to the speed factor of a malfunction condition,
AVTNE denotes a value corresponding to the engine speed factor of a normal condition,
WORADV denotes the normal level of the ignition timing control,
AVADV denotes the average value of the ignition timing factor,
AVFADV denotes a value corresponding to the ignition timing factor of the malfunction condition, and
AVTADV denotes a value corresponding to the ignition timing factor of the normal condition.

14. A diagnostic apparatus as claimed in claim 1, wherein a catalyst remaining ratio indicative of a ratio of the exhaust gas component remaining in the catalytic converter is calculated based on the temperature factor, and the amount of the exhaust gas component flowing out the catalytic converter is calculated based on the catalyst remaining ratio.

15. A diagnostic apparatus as claimed in claim 14, wherein the engine control parameter is an engine speed, the engine speed is increased when temperature increase of the catalytic converter is desired, and the temperature factor is calculated based on the engine speed.

16. A diagnostic apparatus as claimed in claim 14, wherein the engine control parameter is ignition timing of the engine, and the ignition timing is retarded when temperature increase of the catalytic converter is desired, and the temperature factor is calculated based on the ignition timing.

17. A diagnostic apparatus as claimed in claim 1, wherein the controller is further adapted to derive a ratio of an idling operation during the cold engine condition, the determination of malfunction of the engine operation is inhibited when the ratio of the idling operation is less than a predetermined criterion value.

18. A diagnostic apparatus as claimed in claim 17, wherein the ratio of the idling operation is a ratio of a cumulative number of combustion cycles of the engine for the idling operation during the cold engine condition to a cumulative number of combustion cycles of the engine during the cold engine condition.

19. A diagnostic apparatus for an internal combustion engine as claimed in claim 1, wherein
the controller is further adapted to derive a heat amount supplied to the catalytic converter based on the temperature factor, estimate an initial heat amount of the catalytic converter based on an engine temperature, estimate a total heat amount of the catalytic converter based on the heat amount and the initial heat amount, estimate a state of the catalytic converter, and estimate the amount of the exhaust gas component flowing out the catalytic converter based on the state of the catalytic converter.

20. A diagnostic method for an engine having a catalytic converter to treat an exhaust gas component discharged from the engine, the method comprising:
operating an engine with an engine control parameter to increase catalyst temperature of a catalytic converter during a cold engine condition;
calculating a temperature factor indicative of a temperature increase of the catalytic converter based on the engine control parameter;
estimating an amount of the exhaust gas component flowing out the catalytic converter based on the temperature factor; and
determining malfunction of the engine operation to increase catalyst temperature of the catalytic converter based on the amount of the exhaust gas component flowing out the catalytic converter.

* * * * *